W. Olds,
Brick Machine Truck.
No. 109,339. Patented Nov. 15, 1870.
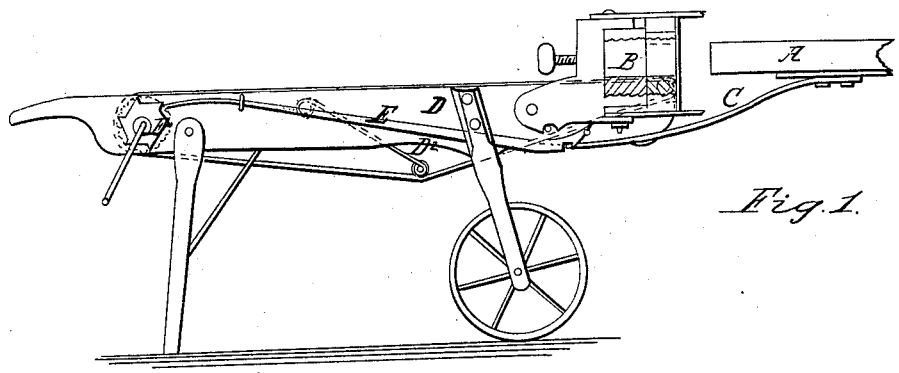
Fig. 1.
Fig. 2.
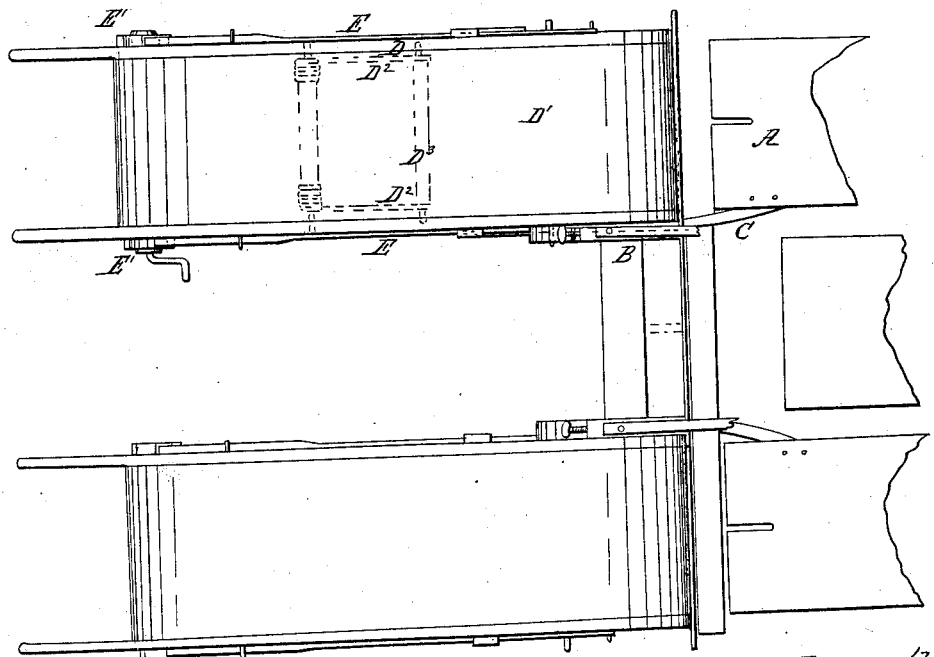
Witnesses:
C. F. Clausen
B. Edie
Inventor:
Walker Olds
D. P. Holloway & Co
Atty

United States Patent Office.

WALKER OLDS, OF ALBANY, ILLINOIS.

Letters Patent No. 109,339, dated November 15, 1870; antedated November 5, 1870.

IMPROVEMENT IN OFF-BEARING TRUCKS FOR BRICK-MACHINES.

The Schedule referred to in these Letters Patent and making part of the same.

*To all whom it may concern:*

Be it known that I, WALKER OLDS, of Albany, in the county of Whitesides and State of Illinois, have invented certain Improvements in Off-bearing Trucks to be used in connection with Brick-Machines; and I do hereby declare that the following is a full, clear, and exact description thereof, reference being had to the annexed drawings making part of this specification, in which—

Figure 1 is a side elevation of a portion of a brick-machine and of an attachment thereto, designed for use in receiving the bricks from such machine, and for transporting them to the kiln or to any other desired locality; and Figure 2 is a plan or top view of the same, showing the aprons upon which the bricks are received as they come from the machine.

Corresponding letters refer to corresponding parts in both figures.

This invention relates to an off-bearing truck to be used in connection with brick-machines, it being designed to receive the bricks as they are passed from the molds of such machines; and It consists in the construction of such a truck, in its combination with a brick-machine, and in the combination of its parts, as will be more fully described hereinafter.

A in the drawings refers to a plunger or press-head, which is for the purpose of pressing or forcing the bricks out of the molds in which they are formed and placing them upon the truck.

In practice there will generally be two trucks attached to one brick-pressing machine, such trucks being arranged upon each side of the point where the bricks are pressed, so that the molds may be shifted from the position which they occupy when the bricks are pressed to the proper positions for having the bricks pressed out of them upon the trucks.

B refers to a frame-work, which receives the reciprocating press-heads or plungers, they being constructed and arranged as shown in a patent granted to me on the 13th of July, 1869, against which the bricks are formed as they are pressed into the molds, said frame-work being so constructed or formed that an attachment can be readily made with projecting pin on side of truck, as shown in fig. 1.

C refers to an arm or spring, which is to be attached to the plunger A in such a manner as to partake of its longitudinal movement as it presses the bricks from the molds.

From the point where it joins the plunger it extends forward for a distance sufficient to permit its outer end to come in contact with and operate the rod or bar E, soon to be described, its outer end being provided with a hook or pin for connecting it with such rod or bar.

D D refer to the side bars of the truck, their distance apart being such as to permit of the apron being of such a width as to receive upon it as many bricks as are contained in one mold.

These bars are provided with pins in their outer sides to form an attachment to the frame-work B, and thus prevent the truck from being pressed away from such frame while the bricks are being deposited thereon.

The outer ends of these bars are made to assume the form of handles, for the purpose of enabling the operator to grasp them in moving the truck.

Upon the outer sides of these bars there are to be attached legs, upon which the outer end of the truck rests, and near their inner ends arms or standards, which form the bearings for the wheels upon which the truck is moved, as clearly shown in fig. 1 of the drawings.

D¹ refers to an apron, upon which the bricks are delivered as they come from the molds, it being made to move by being passed around rollers or cylinders placed near the ends of the bars D, and having their bearings therein.

Small wires are inserted between the fibers of this apron, or are otherwise attached thereto, which extend across it transversely, and are for the purpose of keeping it of equal width in all of its parts as it passes around the rollers upon the truck.

D² refers to springs, of which there are two, one upon either, inside of the bars or frame D, they being coiled around a shaft, and having their ends secured to said frame in such a manner that as their outer ends, or those parts which carry the roller D¹, are pressed upon the apron D¹, which passes beneath such rollers, they serve to tighten such apron, and thus keep its upper surface smooth for the reception of the bricks.

E E refer to sliding bars of metal, which are placed upon the outer surfaces of the bars D, they being arranged as shown in fig. 1, or so that as the truck is placed in the position there shown their forward ends shall engage with the pins or hooks upon arms C, and thus have their movement communicated to them.

It will be observed that the front ends of these bars are curved upward, the object of which is to provide the means of ready attachment to the arms C, and that from this point they extend back through staples, in which they slide, and by which they are supported and guided, to near the handles of the truck, where they come in contact with ratchet-wheels E' E', upon the ends of the shaft, which carries the outer cylinder or roller over which the endless apron passes.

As a consequence of the last-described arrangement of parts, the movements of plunger A is communicated to the ratchet-wheels E' E', and through them, and the roller or cylinder to which they are attached, to the apron, which is thus made to move the proper distance to receive each discharge of bricks as they come from the molds, and carry them outward until the apron is filled, when, by disconnecting the sliding bars from the arms C, the truck may be taken to any desired locality.

The truck is disconnected from the machine by raising its outer end by the handles, thereby depressing its inner end, and disconnecting the projecting-pin, and also pressing down the spring C, detaching it from bar E.

Having thus described my invention,

What I claim, and desire to secure by Letters Patent, is—

1. In combination with a machine for making bricks, the truck, constructed substantially as shown, provided with an endless apron, such apron being operated by the plunger of the machine through the intervening mechanism, constructed substantially as shown, and for the purpose set forth.

2. The combination and arrangement of the springs $D^2 D^2$, roller $D^3$, and apron D, substantially as and for the purpose set forth.

In testimony whereof, I have signed my name to this specification in the presence of two subscribing witnesses.

WALKER OLDS.

Witnesses:
M. S. CHURCHILL,
S. G. PERKINS.